United States Patent
Kang et al.

(10) Patent No.: US 6,266,068 B1
(45) Date of Patent: Jul. 24, 2001

(54) MULTI-LAYER IMAGE-BASED RENDERING FOR VIDEO SYNTHESIS

(75) Inventors: Sing Bing Kang, Cambridge; James M. Rehg, Arlington, both of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/039,022

(22) Filed: Mar. 13, 1998

(51) Int. Cl.⁷ .................................................. G06T 11/60
(52) U.S. Cl. ........................ 345/435; 345/422; 345/429; 382/284
(58) Field of Search .................................. 345/433, 429, 345/419, 435, 422; 382/284

(56) References Cited

U.S. PATENT DOCUMENTS

| | | | |
|---|---|---|---|
| 5,175,805 | * 12/1992 | Carrie | 345/422 |
| 5,295,234 | * 3/1994 | Ishida et al. | 345/422 |
| 5,488,674 | * 1/1996 | Burt et al. | 382/284 |
| 5,557,684 | 9/1996 | Wang et al. | 382/107 |
| 5,644,364 | 7/1997 | Kurtze et al. | 382/107 |
| 5,656,737 | 8/1997 | Wistow | 536/23.5 |
| 5,657,402 | * 8/1997 | Bender et al. | 382/284 |
| 5,706,417 | * 1/1998 | Adelson | 345/429 |
| 5,850,352 | * 12/1998 | Moezzi et al. | 345/419 |

OTHER PUBLICATIONS

Avidan et al., "Novel View Synthesis in Tensor Space," IEEE Computer Society Conference on Computer Vision and Patter Recognition, Jun. 1997, Puerto Rico.

Debevec et al., "Modeling and Rendering Architecture from Photographs: A hybrid geometry– and image–ased approach," Computer Graphics Proceedings, Annual Conference Series, 1996.

Faugeras, O., *Three–Dimensional Computer Vision: A Geometric Viewpoint (Artificial Ingelligence)*, Chapter 6: "Stereo Vision," pp. 165–176.

Fuchs, H., "On Visible Surface Generation By a Priori Tree Structures," ACM SIGGRAPH 1980.

Greene et al., "Creating Raster Omnimax Images from Multiple Perspective Views Using the Elliptical Weighted Average Filter," IEEE Computer Graphics and Applications, Jun. 1986.

(List continued on next page.)

*Primary Examiner*—Mark Zimmerman
*Assistant Examiner*—Kimbinh T. Nguyen
(74) *Attorney, Agent, or Firm*—Hamilton, Brook, Smith and Reynolds, P.C.

(57) ABSTRACT

A computerized method and related computer system synthesize video from a plurality of sources of image data. The sources include a variety of image data types such a collection of image stills, a sequence of video frames, and 3-D models of objects. Each source provides image data associated with an object. One source provides image data associated with a first object, and a second source provides image data associated with a second object. The image data of the first and second objects are combined to generate composite images of the first and second objects. From the composite images, an output image of the first and second objects as viewed from an arbitrary viewpoint is generated. Gaps of pixels with unspecified pixel values may appear in the output image. Accordingly, a pixel value for each of these "missing pixels" is obtained by using an epipolar search process to determine which one of the sources of image data should provide the pixel value for that missing pixel.

14 Claims, 5 Drawing Sheets

OTHER PUBLICATIONS

Kang, S.B., "A Survey of Image–based Rendering Techniques," Cambridge Research Laboratory Technical Report Series, Digital Equipment Corporation, Aug. 1997.

Laveau et al., "3–D Scene Representation as a Collection of Images and Fundamental Matrices," Institut National de Recherche en Informatique et Automatique (INRIA), No. 2205, Fevrier 1994.

Longuet–Higgins, H.C., "A computer algorithm for reconstructing a scene from two projections," Macmillan Journals Ltd., *Nature*, vol. 293, Sep. 10, 1981.

McMillan et al., "Head–tracked stereoscopic display using image warping," IS&T/SPIE Symposium on Electronic Imaging Science and Technology, SPIE Proceedings #2409A, San Jose, California, Feb. 5–10, 1995.

Rehg et al., "Model–Based Tracking of Self–Occluding Articulated Objects," $5^{th}$ International Conference on Computer Vision, Cambridge, Massachusetts, Jun. 1995.

Shashua, A., "Algebraic Functions For Recognition," IEEE Transactions on Pattern Analysis and Machine Intelligence, vol. 17, No. 8, Aug. 1995.

Wang et al., "Representing Moving Images with Layers," IEEE Transactions on Image Processing, vol. 3, No. 5, Sep. 1994.

* cited by examiner

MULTI-LAYER IMAGE-BASED RENDERING FOR VIDEO SYNTHESIS

FIELD OF THE INVENTION

This invention relates generally to video synthesis, and more particularly to a method and apparatus for synthesizing video from multiple input layers or channels of image data.

BACKGROUND

Many applications, such as video editing, computer games, computer graphics for entertainment, and multimedia authoring, are based on the synthesis of video from a wide variety of sources of input data. In computer games, for example, the rendering of texture-mapped 3-D models at video rates is key to the realism of the game. In video editing applications, what differentiates on-line systems from off-line systems is the ability to composite multiple video streams in real-time. Video synthesis from still images can be found in multimedia CD's based on Apple Computer's QuickTime VR™, where virtual camera motion is synthesized using cylindrical panoramic mosaics constructed from sets of still images. Currently, such applications use highly specialized video synthesis techniques that are usually restricted to a single input data type and, generally, are based either on the use of 3-D models or on 2-D video representations that cannot support a full range of geometrically correct 3-D effects.

The effort involved in constructing 3-D graphical models presents a significant barrier to their widespread use. Many modern computer graphics systems, for example, are based on rendering texture-mapped polygons. Often, however, large numbers of polygons are required for visual realism, making 3-D model creation difficult and time-consuming. The technical challenge in producing 3-D models from images is even greater when integrating information from multiple views into a single 3-D representation.

Video editing systems, on the other hand, can combine multiple video streams using 2-D techniques, such as alpha blending, to generate video output without specifying complex 3-D models. An example of such a technique can be found in Kurtze et al., U.S. Pat. No. 5,644,364. Video editing can typically support image operations like translation, zooming, and planar warps. However, such systems lack a complete representation of the geometry of the scenes described by the video sequences. As a result, the types of 3-D effects that they can provide are extremely limited. For example, video editing systems cannot simulate a virtual change in the camera position in a manner that is guaranteed to be geometrically correct. Further, although these systems can handle occlusions by organizing several video streams into layers, they cannot handle self-occlusions within a layer, or more complex occlusion relations between layers. Consequently most 3-D effects are rendered off-line and then mixed in. Mosaic-based systems, such as Apple Computer's QuickTime VR (i.e., video synthesis that uses still images of a scene taken at different camera positions), can accurately simulate camera rotation and zooming, but cannot simulate virtual camera views with arbitrary translations because of limitations in the mosaic representation of scene geometry.

Image-based rendering (IBR) presents a compelling approach to image synthesis. IBR provides an alternative to the difficult process of building 3-D models from images, allowing the synthesis of new images of a static scene directly from a set of images. The 3-D geometric information is computed as needed while rendering a particular virtual view. This computation can operate at any desired level of detail and can therefore be adapted to the needs of the application. Moreover, IBR can produce high quality images even when the number of available sample images for a scene is small. While this dearth of image samples could frustrate the construction of a 3-D model, IBR can still produce new viewpoints in the vicinity of the image samples.

Although image-based rendering is a compelling approach to image synthesis, limitations in the current state of the art prevent their wide-spread application to video synthesis. The standard approach to image-based rendering, as described for example in "Novel View Synthesis in Tensor Space", by Avidan et al. in *Conference on Computer Vision and Pattern Recognition*, pp. 1034–1040, San Juan, Puerto Rico, June 1997, assumes that the motion in a set of input images results solely from the motion of the camera with respect to a static scene. In practice, however, there may be multiple rigid objects in a scene, each moving independently with respect to the camera. Moreover, some of these objects may even be articulated with non-rigid, kinematically-controlled motion. Thus, the standard IBR methods would be unable to synthesize such scenes.

There remains a need, therefore, for a method and apparatus that provide the advantages of IBR over current video synthesis techniques, such as 3-D modeling, video editing, and mosaic-based rendering, but are not limited to scenes with only a single rigid body in motion.

SUMMARY OF THE INVENTION

The present invention relates to a computerized method and a computer system for synthesizing video from a plurality of sources of image data. Each source provides image data associated with an object. In terms of the computerized method, image data associated with a first object is provided from a first source, and image data associated with a second object is provided from a second source. The image data of the first and second objects are combined to generate composite images of the first and second objects. From the composite images, an output image of the first and second objects as viewed from an arbitrary viewpoint is generated.

In one aspect, the method finds a pixel in the output image with an unspecified pixel value, and determines which one of the sources of image data should provide a pixel value for the unspecified pixel value. Generally, the system 100 can combine layers of a single model type or mixed model types. For example, the system 100 can combine image layers with image layers, video layers with video layers, and 3-D model-based layers with 3-D model-based layers.

In other aspects, the method can combine layers of different types, such as image layers with video layers, image layers with 3-D model-based layers, video layers with 3-D model-based layers, and image layers with video layers and 3-D model-based layers.

In terms of the computer system, a composite image generator combines the image data associated with the objects to generate composite images of the objects, and a view generator generating from the composite images an output image of the objects as viewed from an arbitrary viewpoint. In one aspect of the computer system, the view generator finds a pixel in the output image with an unspecified pixel value and determines which one of the sources of image data should provide a pixel value for the unspecified pixel value.

In other aspects of the computer system, layers of different types can be combined, such as image layers with video layers, image layers with 3-D model-based layers, video layers with 3-D model-based layers, and image layers with video layers and 3-D model-based layers.

BRIEF DESCRIPTION OF THE DRAWING

Embodiments of the invention will be described with reference to the accompanying drawings, in which.

DETAILED DESCRIPTION OF EMBODIMENTS

Figure 1:
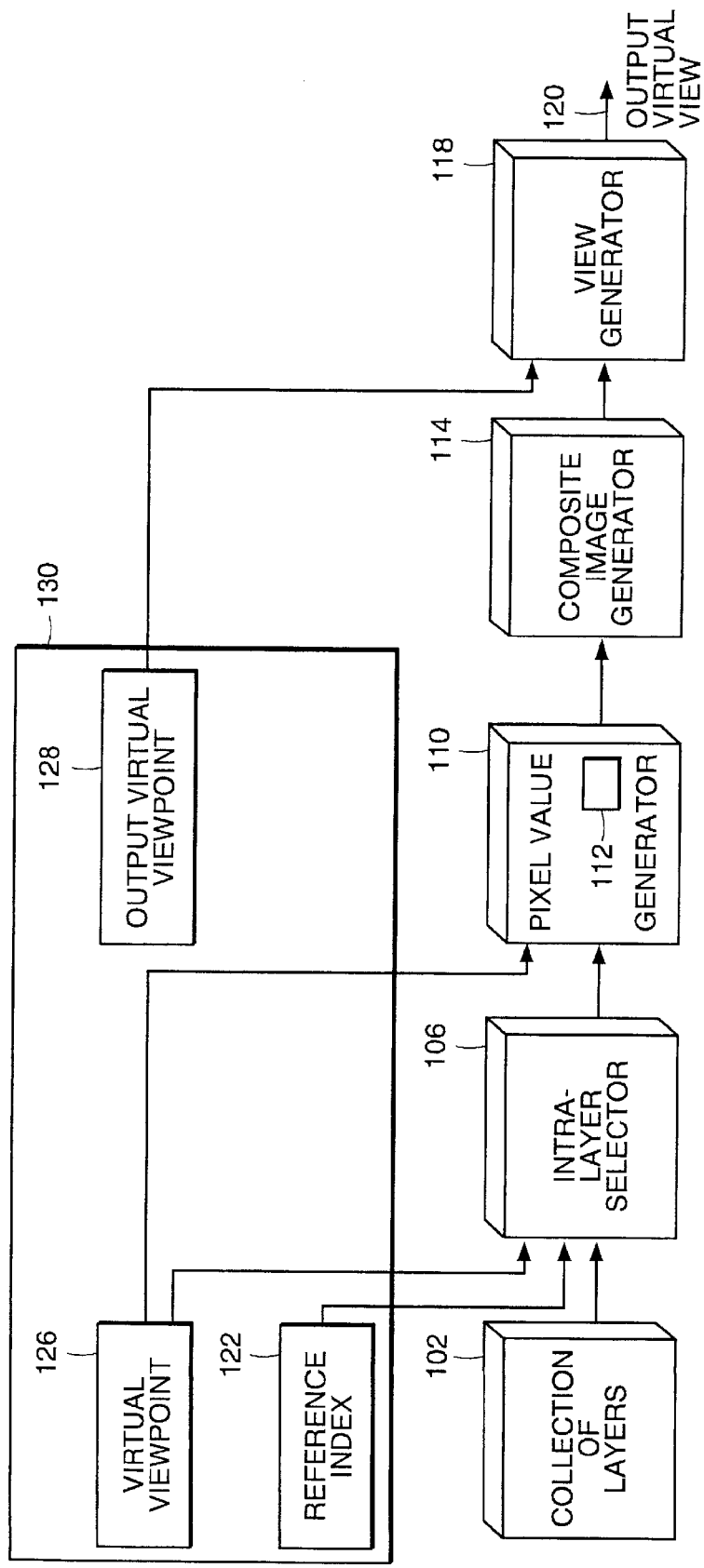
FIG. 1 is a block diagram of an exemplary architecture of for image-based rendering system of the invention.

In brief overview, FIG. 1 shows an exemplary embodiment of a multi-layered image-based rendering system 100 that may produce video sequences according to the principles of the invention. The system 100 can be implemented on a processor-based computer system (not shown) capable of rendering graphical images on a display device. The system 100 includes a collection of layers 102, an intra-layer selector 106, a pixel value generator 110, a composite image generator 114, and a view generator 118. A reference index 122 and a virtual viewpoint 126 are inputs to the intra-layer 106. An output virtual viewpoint 128 is an input to the view generator 118. The view generator 118 produces an output virtual view 120. A user interface 130 described below in more detail in connection with FIG. 5, can be used to input the reference index 122, virtual viewpoint 126, and output virtual viewpoint 128 to the system 100. The system 100 can produce a series of related output virtual views 120 that form a video sequence.

In more detail, the collection of layers 102 supplies image data to the system 100 for view synthesis. The collection of layers 102 includes at least three types of layers: a collection of still images or "snapshots" of a static scene, a matted video sequence of frames corresponding to an object or scene in motion, and a conventional 3-D graphics model. Each still image, video frame, and viewpoint of a 3-D model is referred to generically as a view. A view is an image of an object viewed from a particular viewpoint; the viewpoint is a desired position and viewing direction of a camera with respect to that object. Hereinafter, camera position and viewpoint are used synonymously.

In one embodiment, each layer in the layer collection 102 includes at least two views of a given object or scene (collectively called object). The given object can be an articulated, non-rigid figure or a rigid figure; the object, as shown in the collection or sequence of views, can be moving or static; the object can be opaque, transparent, or textured. Wang et al. describes a system for representing moving objects with layers in "Representing Moving Images with Layers", *IEEE Transactions on Image Processing*, vol. 3, No. 5 pp. 625–638, incorporated by reference herein.

The collection of layers 102, reference index 122, and virtual viewpoint 126 are each input to the intra-layer selector 106; the virtual viewpoint 126 is also provided to the pixel value generator 110. The reference index 122 specifies a particular reference view in a given layer around which new views can be synthesized. The virtual viewpoint 126 specifies a change in the viewpoint relative to the viewpoint of the specified reference view. This new viewpoint can be used to render new views for that layer.

In one embodiment, the views of each layer in the collection of layers 102 are unrelated to the views of each other layer. For example, one layer in the collection 102 can include still images of a background scene, while another layer in the collection 102 may be an articulated moving figure. Accordingly, the reference index 122 and virtual viewpoint 126 can be specified independently for each layer in the collection of layers 102. In another embodiment, the views of one layer may be related to the views of another. For example, a video sequence may have two moving objects, each of which is transformed into an input layer. In this instance, the specified reference index 122 and virtual viewpoint 126 may be the same for both layers.

The intra-layer selector 106 identifies the desired view of each layer, according to the corresponding reference index 122 and corresponding virtual viewpoint 126, and supplies the identified views to the pixel value generator 110. The pixel value generator 110 renders each identified view into a set of pixel values and stores the pixel values in an output buffer 112. Z-depth values are associated with each pixel value in a set.

The pixel value sets are provided to the composite image generator 114 for combining the identified views into a single composite image. In the composite image, a foreground object of one layer may occlude or blend with a background object of another layer, depending upon the opacity of the foreground object. (Foreground objects have pixel values with less depth (i.e., smaller Z-depth values) than background objects.)

Generally, the system 100 can combine layers of a single model type or mixed model types. For example, the system 100 can combine image layers with image layers, video layers with video layers, and 3-D model-based layers with 3-D model-based layers. The system 100 can mix layer types by combining image layers with video layers, image layers with 3-D model-based layers, video layers with 3-D model-based layers, and image layers with video layers and 3-D model-based layers.

Providing a sequence of reference indices 122 and virtual viewpoints 126 results in the synthesis of a sequence of composite images by the composite image generator 114. The composite images are used by the view generator 118 to generate output virtual views 120 from the inputted composite images according to the specified output virtual viewpoint 128. The specified output virtual viewpoint 128 can be any arbitrary viewpoint within proximity of at least one of the viewpoints of the inputted composite images.

Figure 2:
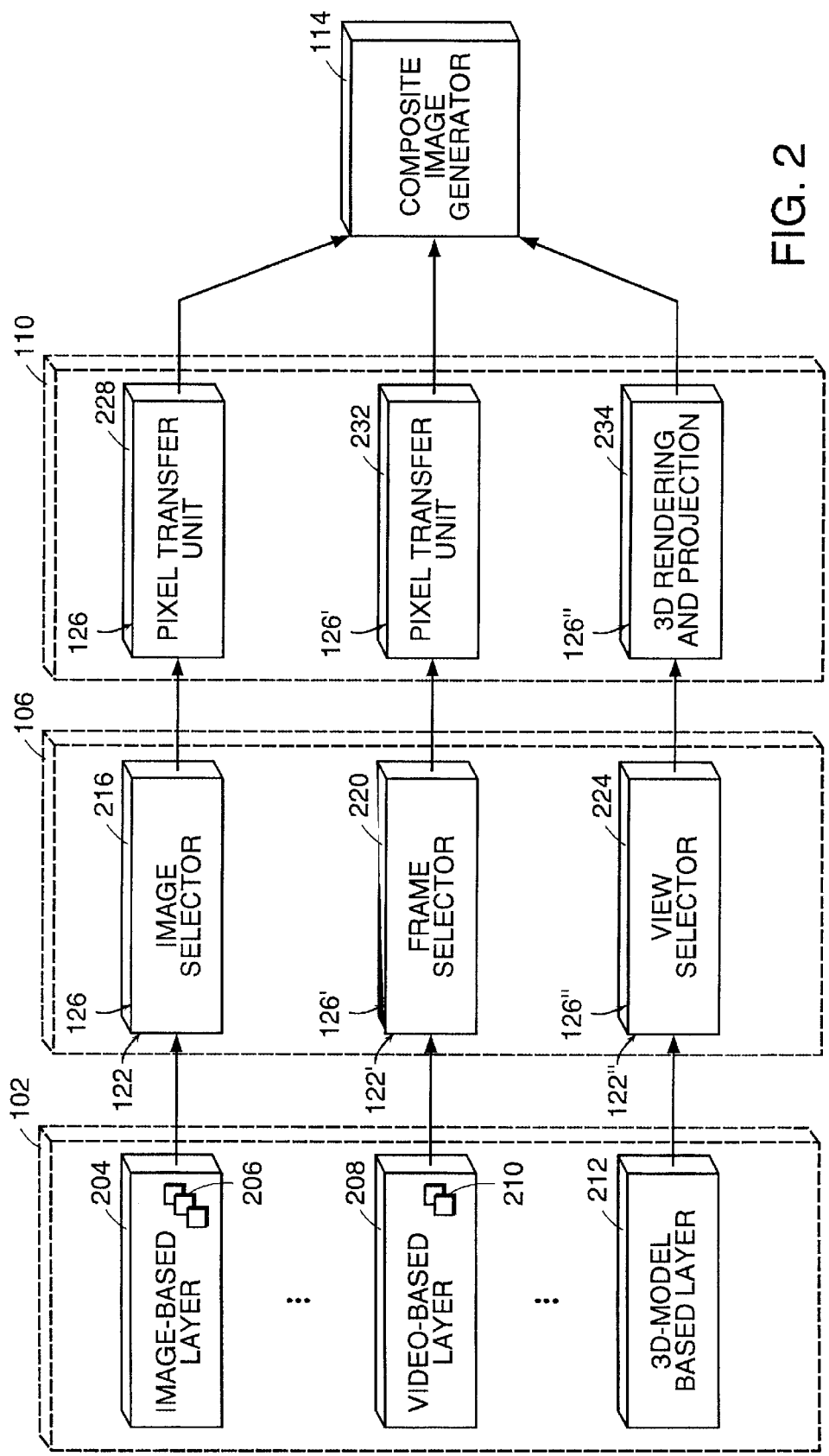
FIG. 2 is a more detailed view of the exemplary architecture in FIG. 1.

FIG. 2 shows the collection of layers 102, the intra-layer selector 106, and the pixel value generator 110 in more detail. The collection of layers 102 includes three types of layers, an image-based layer 204, a video-based layer 208, and a 3-D model-based layer 212. The collection of layers 102 can include more than one input layer for each layer type 204, 208, and 212. The image-based layer 204, called an image layer, includes a set of still images describing a particular scene from various viewpoints. The still images need not be in any particular order.

Each image-based layer 204 (and video-based layer 208) is augmented with information about the geometry of the object or scene in the form of correspondences between pixels. A set of maps 206, one map for each still image, maps pixels in each still image to corresponding pixels in the other still images. By definition, a pixel in one image corresponds to a pixel in another image because a particular point of an object (or scene) appearing in each image projects to these pixels in the respective images. For example, a pixel representing the center of a circle appearing in one still image corresponds to a pixel representing the center of the same circle appearing in another still image.

Along with the pixel correspondences, a description of the pose, position, and intrinsic camera parameters for the viewpoint is provided for each still image in the image layer 204. Intrinsic camera parameters include the focal length, aspect ratio, and image skew. Often, the image layer 204 can describe a static background scene, forming the backdrop for foreground objects, for example, like actresses on a movie set. The video-based layer 208, called video layer, is a matted video sequence (or stream) of frames. A matte is a mask that specifies the pixels in each frame that are associated with the video layer. Each video layer can describe a single, coherent rigid body motion. Accordingly, a video sequence that has multiple moving objects would produce multiple video layers. Each video layer would have a different matte sequence that selects a single particular object in the video sequence. A method for breaking down a video sequence into video layers 208 in the case of articulated body motion is described in the U.S. patent application, Ser. No. 08/XXX,XXX, titled "A Method for Figure Tracking Using 2-D Registration and 3-D Reconstruction" filed by James Rehg et al.

The frames of each video layer are augmented with pixel correspondence data so that geometrically valid effects are possible when that video layer is combined with other layers. Associated with each video frame is a map 210 that maps the pixels in that frame with corresponding pixels in a previous video frame. For each frame in the video layer 208, there is a description of the pose, position, and intrinsic camera parameters for the viewpoint of that frame. Such intrinsic parameters include those mentioned for image layers 204.

The 3-D model-based layer 212 is a conventional computer graphics model which includes a set of explicitly defined 3-D surfaces, represented as polygons, Non-Uniform Rational B-Splines, etc, with texture-mapped or shaded surfaces. The 3-D model can be a volumetric model. Because pixel correspondences between viewpoints of the 3-D model can be automatically generated from two given viewpoints, maps for storing such correspondences are unnecessary. Accordingly, the 3-D model layer 212 can initially have just one view because other views can be generated using that one view and a second specified viewpoint.

In one embodiment, each input layer of the collection of layers 102 is represented either by a set of still images, a collection of video frames, or a 3-D model. One or more of these input layers can be views of moving objects; one or more of these moving objects may be non-rigid (i.e., articulated) figures. Still others of these input layers can be background scenes. In order to synthesize images from such input layers, the desired views of the input layers must be selected. For instance, each video layer 208 includes multiple frames and each image layer 204 includes multiple still images, any of which could be used for video synthesis. Accordingly, the intra-layer selector 106 includes a selector for each type of layer that is input to the system 100. More specifically, the intra-layer selector 106 includes an image selector 216 for handling image input layers 204, a frame selector 220 for video input layers 208, and a view selector 224 for 3-D model-based input layers 212.

The reference index 122, 122', 122" (collectively 122) and virtual viewpoints 126, 126', 126" (collectively 126), are provided to the selectors 216, 220, 224 to provide a reference view around which new views can be synthesized. Generally, a view that has a camera position in the proximity of the camera position of the virtual viewpoint 126 will be selected for a reference view. Specifically, in one embodiment, the image selector 216 selects a particular reference image from the collection of still images of the image layer 204 according to the reference index 122 and virtual viewpoint 126. In another embodiment, the frame selector 220 selects a particular reference frame from the video sequence of the video layer 208 according to the reference index 122' and virtual viewpoint 126. In yet another embodiment, the view selector 224 selects a reference pose at which the 3-D model will be rendered using conventional 3-D graphics techniques according to the reference index 122" and the virtual viewpoint 126".

The pixel value generator 110 includes a 3-D rendering and projection unit 234 and pixel transfer units 228 and 232. The 3-D rendering and projection unit 234 uses conventional rendering and projecting techniques for determining pixel values according to the virtual viewpoint 126" and the selected reference 3-D model 212. The pixel transfer units 228 and 232 perform image transfers, which is the process of converting a single layer of still images or video frames into pixel values according to the specified virtual viewpoint 126, 126'; the transfer unit 228 operates on still images, and the transfer unit 232 on video frames. Each unit 228, 232, and 234, produces a set of pixel values according to the applicable reference view and specified virtual viewpoint. The pixel values produced by the units 228, 232, and 234, are supplied to the composite image generator 114, which combines the pixel values into a single composite image.

Although not required to practice the principles of the invention, one embodiment of the pixel value generator 110 can produce new views for each input layer 204, 208, 212. The virtual viewpoints 126 specify a desired viewpoint relative to the viewpoint of the selected reference view at which new views can be generated. By using the geometric information provided by the pixel correspondences stored in the maps 206, 210, the pixel transfer units 228, 232 can produce geometrically correct camera effects, including, for example, rotation, translation, and zooming. A video sequence of an object (or scene), therefore, can be edited by changing the camera position from the viewpoint at which the sequence was filmed, and by producing a new video sequence of the object from the viewpoint of the new camera position. The visual effects attained by moving the camera position appears realistic because the geometric correctness of the original sequence is maintained in the new sequence. The preservation of such geometric correctness is an advantage over conventional techniques such as alpha-based video rendering or panoramic mosaics.

In one embodiment, the pixel transfer units 228, 232 of the invention perform image-based rendering using trilinear or trifocal tensors. A trilinear tensor links pixel correspondences across three images (or views). If the intrinsic camera parameters (e.g., focal length) are known, the trilinear tensor can be computed based on the inputted virtual viewpoint 126, 126'. The technique can generate new views from only two input views (See Avidan and Shashua's "Novel View Synthesis in Tensor Space" in *Conference on Computer Vision and Pattern Recognition*, pp. 1034–1040, San Juan, Puerto Rico, June 1997, incorporated by reference herein). There, an initial trilinear tensor was computed by making the third view coincide with the second view.

The elements of the initial trilinear tensor and intrinsic camera parameters can be recovered by using the 8-point algorithm described by Longuet-Higgins in "A computer algorithm for reconstructing a scene from Two Projections" in *Nature*, 293:133–135, 1981, incorporated by reference herein, and an image-based metric that minimizes projection errors. Other techniques known in the art can be used to generate output virtual views 120 of a static scene from a small number of still images or frames, but the technique of image-based rendering is necessary to synthesize video sequences that result in geometrically correct effects.

In one embodiment, the pixel transfer units 228, 232 use a painter's algorithm to ensure that pixels are evaluated in proper order so that the nearer objects of a scene occlude the more distant objects in the scene. The painter's algorithm first computes the projection of the center of the virtual camera on the reference view. If the virtual camera center is in front of the center of the camera corresponding to the reference view, then scanning proceeds from the outer portions of the reference view towards the projected virtual camera center. Otherwise, scanning proceeds from the projected virtual camera center outwards to the outer portions of the reference view. An exemplary painter's algorithm is described by McMillan et al. in "Head-tracked stereoscopic display using image warping", SPIE Symposium on Electronic Imaging Science, San Jose, Calif., February 1995, incorporated by reference herein. An alternative embodiment can use a conventional Z-buffer technique to evaluate the pixels.

Image transfers may produce gaps (i.e., pixels with unspecified pixel values) in the new view. Gaps appear when a small patch from the reference view is mapped onto a larger patch on the new view. Thus, the pixel transfer units 228, 232 perform pixel interpolation to remove any gaps that may have appeared during the image-based rendering. Many interpolation techniques exist. An effective method, for example, is Elliptical Weighted Averaging, which uses interpolant kernels with adaptive sizes. The technique of Elliptical Weighted Averaging is described by Greene et al. in "Creating Raster Omnimax Images from Multiple Perspective Views using the Elliptical Weighted Average Filter," in *IEEE Computer Graphics and Applications*, pp. 21–27, June 1986, incorporated by reference herein.

The composite image generator 114 receives the sets of pixel values produced by the units 228, 232, 234 from the input layers 204, 208, 212 and combines the sets using the Z-depth values associated with the pixel values to produce composite images. The pixel correspondences of the input layers can be used to produce pixel correspondences between the composite images. The combining of the pixel values merges the objects of the various input layers while preserving the geometric correctness of those objects in the resulting composite images. Combining views at the pixel level, particularly views of input video layers, minimizes the loss of information of the shape of objects that can result from data compression or approximation. The resulting composite images themselves collectively form a new layer that can be subsequently included in the collection of input layers 102. Notably, the construction of the composite images (and output virtual views 120) does not require the laborious construction of explicit 3-D models.

The view generator 118 receives the composite images produced by the composite image generator 114 and the output virtual viewpoint 128, which can be specified by user input. From the composite images and the output virtual viewpoint 128, the view generator 118 produces the output virtual view 120 using the multiple layer image-based rendering (multiple layer IBR) technique of the invention.

Figures 3A, 3B:
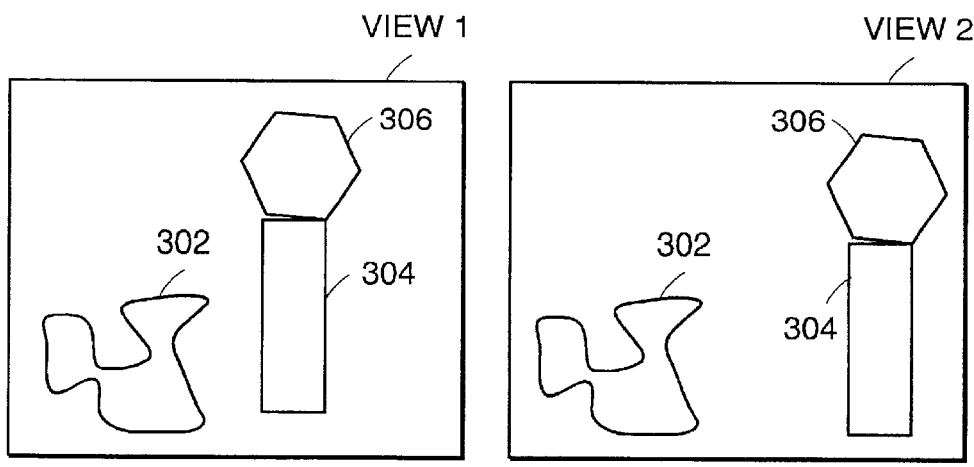
FIGS. 3A–3E are exemplary two input layers of views that illustrate the multiple layer image-based rendering of the invention.

FIGS. 3A–3E illustrate an exemplary application of the multiple layer image-based rendering of the invention. FIGS. 3A and 3B are two different viewpoints, View 1 and View 2, of a particular static scene of three objects 302, 304, and 306. The camera positions corresponding to each of the Views 1 and 2 can be recovered using Longuet-Higgins 8-point algorithm described above. Using conventional image-based rendering techniques, View 1 and View 2 can be used to generate new, arbitrary views of the scene. Together, View 1 and View 2 and any newly generated arbitrary views are views of one input layer, which can be any of above-mentioned types.

According to the principles of the invention, a second layer can be added to the input layer of View 1 and View 2. The second layer (not shown) includes views of an ellipse 308. This new second input layer can be, for example, a segmented portion of a video sequence, a set of image stills, or projections of a 3-D model. In the case where the second input layer is a projection of a 3-D model of the ellipse 308, then initially just one view of the ellipse 308 is necessary because other views can be generated for any other specified viewpoint.

Figures 3C, 3D:
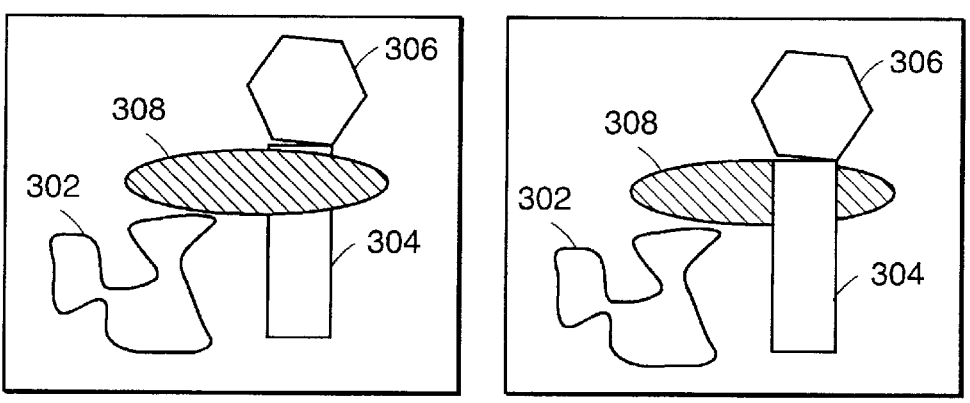

FIG. 3C shows an exemplary composite image of the objects 302, 304, 306, as viewed according to the viewpoint of View 1 of the first input layer, and the shaded ellipse 308 of the second input layer as viewed according to a specified reference view. The composite image was generated by combining the set of pixel values corresponding to View 1 with the set of pixel values corresponding the shaded ellipse 308. Attributes of objects in the second input layer, e.g., depth, position, and orientation, can be modified interactively using a user interface 130. FIG. 3D, which is a second composite image of objects 302, 304, 306 and the ellipse 308, shows the effects of modifying the depth of the ellipse 308.

Figure 3E:
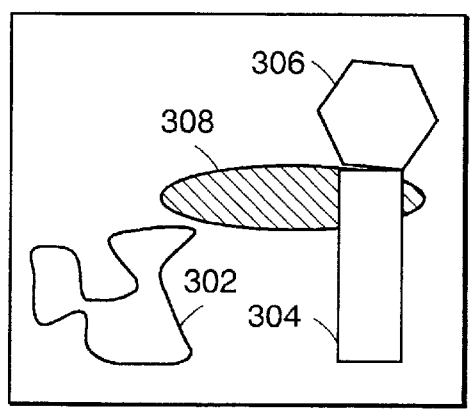

Because the relative camera positions between View 1 and View 2 of the first input layer and the depth of the ellipse 308 are known, the ellipse 308 can be mapped onto View 2. The result is the composite image shown in FIG. 3E. Accordingly, the composite images in FIGS. 3D and 3E are two static views of a newly formed scene of the objects 302, 304, 306, combined with the ellipse 308. New, output virtual views 120 of the objects 302, 304, 306, and 308, can be computed from these composite images using multiple layer IBR. Consequently, a video sequence, for example, could be edited by inserting moving figures obtained from one video stream into a background scene taken from another video.

Multiple Layer Image Based Rendering

In one embodiment of multiple layer IBR of the invention, the painter's algorithm described above for producing new views for a single input layer can be used for multiple input layers. Alternatively, standard Z-buffering can be used, but this requires comparing Z-depth values of pixels of from each input layer. The advantages of the painter's algorithm over the Z buffer technique is that the painter's algorithm can require much less memory for pixel data storage and does not require a depth comparison for each pixel.

Because the composite images contain objects from multiple layers the painter's algorithm is more complicated for multiple layer IBR than for single input layer IBR. Now, when gaps appear in the new output virtual view 120, the task is to find the appropriate input layer that can supply the correct pixel value to the missing pixel value. Consequently, when generating a new output virtual view 120 from composite images, the multiple layer IBR technique of the invention draws the layers in depth order and determines which layer contains the data for any missing pixel values that result. This technique can handle self-occlusion by a single layer and complex occlusions between layers.

Where there are multiple overlapping layers, care must be taken to paint the "farther" layers first, so that pixels from the closer layers will be painted last. This would require that a drawing order for the layers be determined. To produce this order it may be necessary to split some input layers into multiple pieces so that they can be ordered.

A modified version of the Binary Space Partition (BSP) tree 20 representation described in Fuchs et al., "On Visible Surface Generation by Apriori Tree Structures", *Computer Graphics* (*SIGGRAPH'80*), pp. 124–133, 1980, incorporated by reference herein, may be used produce ordered layers from arbitrary virtual views, provided the layers can be approximately locally by planar patches.

As with IBR of a single input layer, multiple layer IBR may produce gaps of unspecified pixel values in the output virtual view 120. Such gaps may result from disocclusion (i.e., previously occluded object portions become visible in the new output virtual view) or from mapping pixels from small pixel areas to large pixel areas. Any gaps that result from mapping small pixel areas to larger areas can be filled by interpolating each layer separately before the composite images are developed, or the gaps can be filled by interpolating from the composite images.

For gaps resulting from disocclusion, the correct layer for providing each missing pixel value needs to be determined from the set of input layers because the missing pixel values are not available from the composite images. In one embodiment, an epipolar search process is applied to each input layer in the set of layers to find the correct layer for providing a missing pixel value. Because the relative camera positions for the reference views of each layer are known, given a particular pixel in one view, the corresponding pixel in another view is constrained to lie on a line called the epipolar line. Applying this constraint to each input layer, a value for a missing pixel is determined by:

1. computing an epipolar line in each of two reference views of that layer (an exemplary technique for computing an epipolar line is described by Olivier Faugeras in "Three-Dimensional Computer Vision", MIT Press 1993, pp. 169–174, incorporated by reference herein);
2. applying the painter's algorithm to determine the scanning order along an epipolar line in one of the reference views (the actual scanning order for pixel filling is the reverse of the order for the painter's algorithm);
3. finding, for each point along the scanned epipolar line in the first reference view, the corresponding point in the other reference view. If the corresponding point in the other reference view lies on the epipolar line in that view, then this point is a candidate for supplying the missing pixel value; if such an intersection occurs only at one layer, then this particular point is the only candidate for providing the missing pixel value. Should intersections occur, however, in multiple layers, there will be multiple candidates. In this instance, the Z-depths of the candidate points are compared to determine the frontmost pixel, which is then used to fill the gap pixel.

Figure 4A:
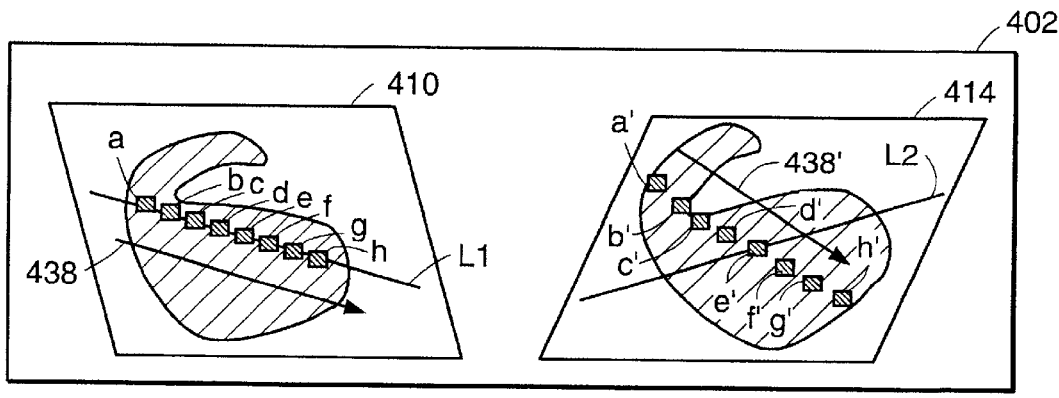
FIGS. 4A–4C are two exemplary input layers and an output virtual view that provide an example illustrating a gap filling process of the invention.
Figure 4B:
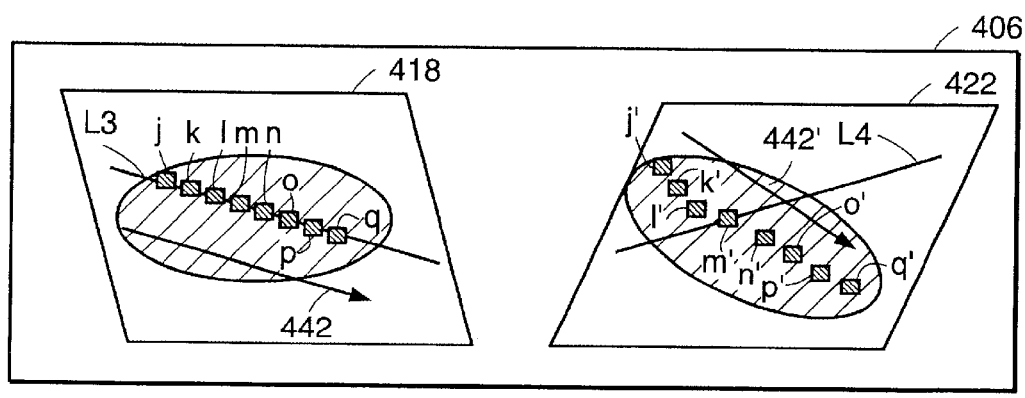
Figure 4C:
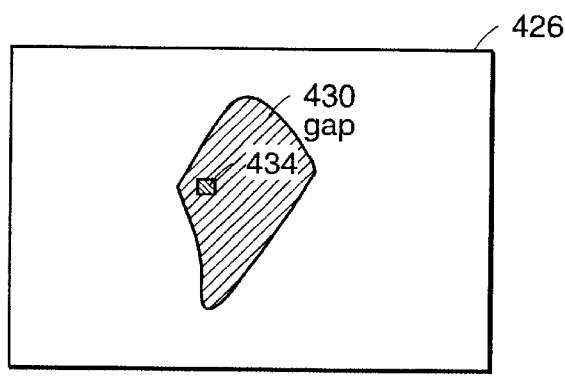

FIGS. 4A–4C provide an example that illustrates the gap-filling process of the invention as applied to two input layers. One input layer 402 includes two reference views 410, 414; the other input layer 406 includes two reference views 418, 422. From these two input layers, composite images (not shown) were produced as described above. From these composite images, an output virtual view 426 was generated, which had a gap of missing pixels. FIG. 4C shows only an exemplary gap 430 (shaded) in the output virtual view including a particular missing pixel 434.

In the first layer 402, the epipolar lines corresponding to the missing pixel 434 are L1 in reference view 410 and L2 in reference view 414. In the second layer 406, the epipolar lines corresponding to the missing pixel 434 are L3 in reference view 418 and L4 in reference view 422. Given that the scanning order 438 in reference view 410 is along pixels a, b, c, d, e, f, g, and h, the corresponding pixels in reference view 414 are a', b', c', d', e', f', g', and h', respectively. For the second input layer 406, the scanning order 442 in reference view 418 is along pixels j, k, 1, m, n, o, p, and q, the corresponding pixels in reference view 422 are j', k', l', m', n', o', p', and q', respectively.

In the example shown in FIGS. 4A and 4B, pixels e and e' lie on their corresponding epipolar lines of the first layer 402, and pixels m and m' lie on their corresponding epipolar lines in the second layer 406. Thus, pixels e and m are candidates to supply a pixel value for the missing pixel 434. A depth comparison is made between pixels e and m. The closer pixel (i.e., the pixel with the smaller depth value) is selected. For example, if pixel e were the closer of pixels e and m, then the value of pixel e determines the value of the missing pixel 434. If only one of the layers 402, 406 had corresponding pixels that fell on their respective epipolar lines (e.g., pixels m and m' of the second layer 406), then a Z-depth comparison is unnecessary, and the value of pixel m determines the pixel value of the missing pixel 434. An advantage of the epipolar search process of the invention is that the process focuses the search to specific pixels in each layer, a far more efficient method than searching every pixel of each layer to find a value for the missing pixel. Moreover, Z-depth comparisons are reserved to when the epipolar process identifies more than one pixel candidate.

There may be instances when the frontmost layer or layers determine most of pixels in the output virtual view and the back layers contribute relatively few pixels. In such instances, rendering each input layer, from the back layer to the front, would be inefficient because many pixel values of the back layers are overwritten by the pixel values of the frontmost layer or layers. Rather than transferring all the pixel values of each input layer, one embodiment renders the pixel values of the frontmost layer or layers, and subsequently performs the gap-filling technique described above to render the remaining unspecified pixel values from the back layers.

For this embodiment, any gaps caused by disocclusion must be distinguished from gaps caused by mapping small areas in a reference view to larger areas in the output virtual view. Consequently, interpolation for a missing pixel is performed only if that missing pixel is surrounded by transferred pixels from the same layer. Otherwise, the epipolar search process is used to fill in the missing pixel value.

Multiple Layer IBR Using a Large Collection of Composite Images

Above, the multiple layer IBR technique of the invention is shown to produce an output virtual view 120 from two composite images. The multiple IBR technique can also operate on three composite images using the trilinear tensor method. For more than three composite images, multiple layer IBR is applied to an appropriately chosen subset (two or three) of the composite images in the sequence. The selection of the subset of composite images can be based on proximity of the current virtual camera, as determined by the virtual viewpoint 128, to an estimated camera position in the sequence. Because of the computational expense of generating composite images, they should be computed and cached to avoid recomputation and reused on an as-needed basis.

For the case of using a collection of more than three images, a blending function can be used to weight the contribution of each composite image in the subset to the output virtual view 120. For example, the blending function can weight each composite image in the subset equally or increase the weights for composite images with closer proximity to the output virtual viewpoint 128. Consequently, a wide range of translations and orientations of a virtual camera can be attained. Depending on the particular composite image sequence, the virtual camera can appear to pan around and view an object, for example, so that different occluding sides of the object can be viewed in succession.

User Interface

Figure 5:
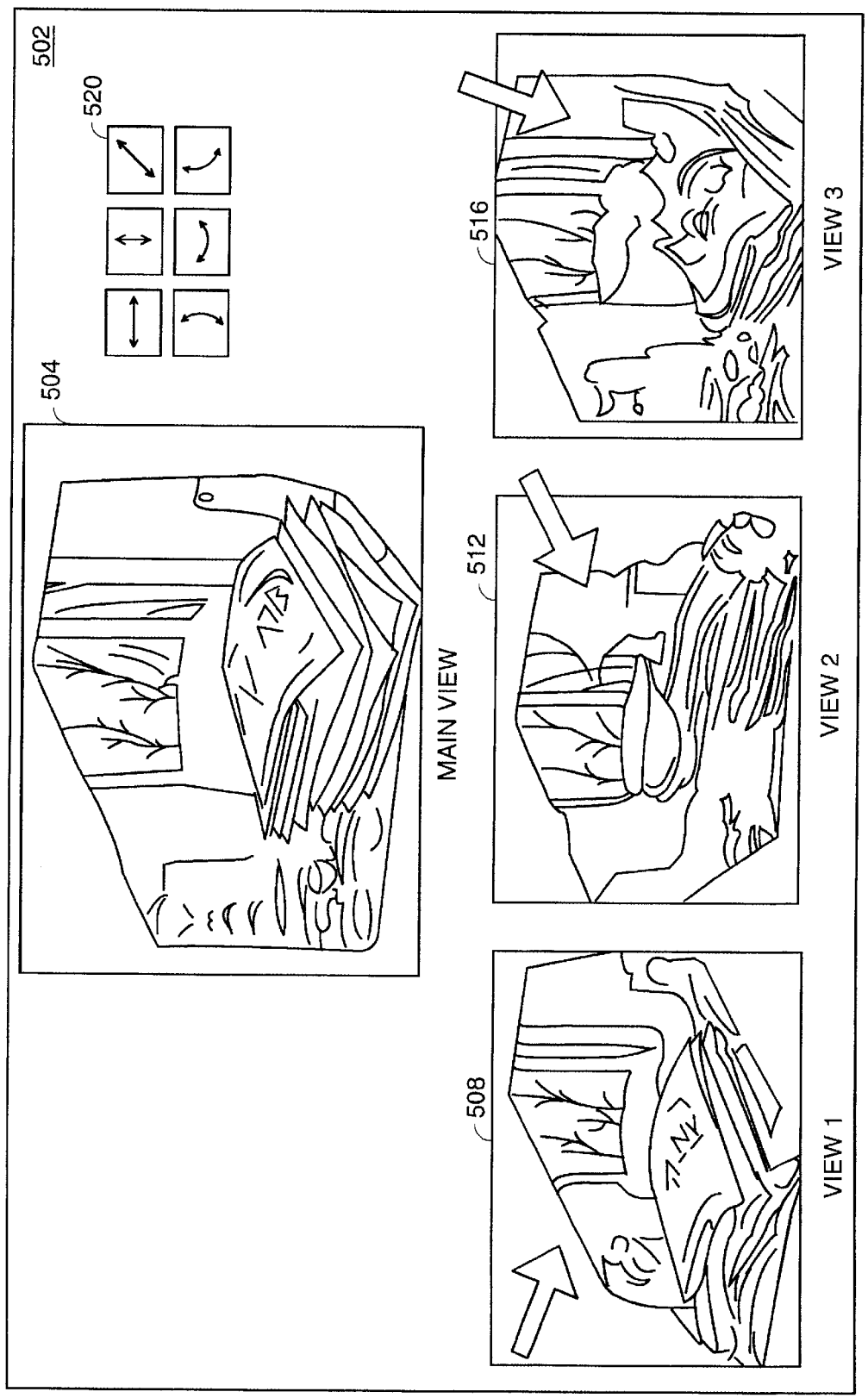
FIG. 5 is an exemplary user interface that can be used to select and modify views.

FIG. 5 shows an exemplary user interface 130 for facilitating video synthesis through user direction. The user interface 130 presents the user with a set of views of a particular scene on the screen 502 of a display device. The views include a main view 504 of the scene, a first side view 508 of the scene, a top view 512 of the scene, and a second side view 516 of the scene. A set of arrow keys 520 at the right of the main view 504 manipulates the virtual camera position that produces the main view 504. By pressing these keys, with the use of an input device such as a mouse, for example, the user can change the position of the virtual camera for the main view 504 until a desired viewpoint is achieved.

The other views 508, 512, 516 provide the user with visual guidance in the selection of the desired viewpoint. To avoid producing severely distorted views, the virtual camera is restricted to the proximity of actual camera positions used in the views; but, this limitation does not apply where only full 3-D models are used as reference sources. The main view 504 at this new arbitrary viewpoint can then be used to produce composite images with other layers.

One embodiment of the user interface 130 allows the user to control virtual camera position and intrinsic camera parameters, such as focal length, and the relative depths of background and foreground objects (or layers). To edit other attributes of the object, such as the position and orientation, the interface 130 allows the user to isolate a given layer out of a potentially large number of objects and scenes, using the input device to highlight that layer. That is, the user can modify characteristics of a particular object in a given scene independently of other objects in the scene. (The particular object is part of one input layer, and the other objects of the scene are part of another input layer.) Thus the user can control the relative position of multiple objects in a composite scene.

To illustrate, the particular object is selected by using an input device, such as, for example, a mouse. Dragging the mouse after clicking one mouse button, (e.g., the left button), moves the object laterally in the scene, dragging the object up and down after clicking a second button, (e.g., the right), changes the depth of the object in the scene, and dragging the mouse left and right after clicking the second button changes the size of the object in the scene. Thus, the user is able to customize composite images of the object and the scene by dynamically modifying the attributes of the object.

The interface 130 may accommodate other modifications, such as of texture on an object in any layer, background or foreground, and of dynamic texture, that is, texture that changes as a function of viewpoint for moving or articulated objects.

Although described in the context of particular embodiments, one skilled in the art will recognize that the invention can enable many new products in the field of visual computing, specifically, for example, in the areas of image and video editing and multimedia authoring. As new model types for input layers are developed, the image data for such layers may also be combined to produce composite images according to the principles of the invention. The invention may provide the basis for building libraries of videos, stills, and 3-D models that can be edited and combined to create new video content according to the principles of the invention. Thus, existing video content can be reused for new purposes. Moreover, the invention may enable the development of plug-ins for commercial video editing packages. Further, the invention may provide an alternative or complementary approach to traditional 3-D graphics rendering. It will be apparent, therefore, that variations and modifications may be made to the described embodiments, with the attainment of all or some of the advantages. It is the object of the appended claims, therefore, to cover all such variations and modifications as come within the spirit and scope of the invention.

We claim:

1. A computerized method for synthesizing video, comprising the steps of:

providing image data associated with a first object from a first layer, the first image layer for the first object including a plurality of views of the first object, each view of the first object augmented with data representing pixel correspondences between the views;

providing image data associated with a second object from a second layer, the second layer independent of the first layer, the second image layer for the second object including a plurality of views of the second object, each view of the second object augmented with data representing pixel correspondences between the views;

combining the image data of the first and second objects dependent on relative pixel depth provided by the pixel correspondences to generate composite images of the first and second objects; and rendering from the composite images a geometrically correct output image of the first and second objects as viewed from an arbitrary viewpoint wherein the first and second objects move independently with respect to the arbitrary viewpoint.

2. The computerized method of claim 1, further comprising the steps of:

finding a pixel in the output image with an unspecified pixel value; and determining which one of the layers should provide a pixel value for the unspecified pixel value.

3. The computerized method of claim 1, further comprising the step of:

modifying the image data associated with the one of the objects before combining the image data of the first and second objects.

4. The computerized method of claim 1, wherein the first and second objects are independently moving objects.

5. The computerized method of claim 4, wherein one of the moving objects is an articulated figure.

6. The computerized method of claim 1, wherein the layer associated with the first object includes a set of views of the first object, and further comprising the steps of:

selecting a subset of views from the set of views, the subset of views augmented with data representing pixel correspondences;

selecting a new viewpoint for viewing the first object; and generating new image data associated with the first object using the selected subset of views, the image data representing a new view of the first object as viewed from the new viewpoint.

7. The computerized method of claim 1, wherein the layer is selected from the group consisting of a set of still images, a video sequence of frames, and viewpoints of a 3-D model.

8. The computerized method of claim 1, further comprising the steps of:

providing image data associated with a third object from a third layer; and combining the image data of the third object when combining the image data of the first and second objects; and wherein the image data of the first object includes a still image, the image data of the second object includes a frame of a video sequence, and the image data of the third object includes a 3-D model of the third object.

9. A computerized method for synthesizing video, comprising the steps of:

providing a first view of a first object from a first layer associated with the first object and a second view of a second object from a second layer associated with the second object, the first layer independent of the second layer;

generating pixel values corresponding to first view of the first object;

generating pixel values corresponding to the second view of the second object; and combining the pixel values of the first view and the pixel values of the second view dependent on relative pixel depth provided by the pixel correspondences to generate a composite image of the first and second objects.

10. The method of claim 9, further comprising the steps of:

providing another view of the first object viewed from a different viewpoint than the first view of the first object; and generating from the composite image of the first and second objects a geometrically correct output image of the first and second objects as viewed from the different viewpoint.

11. A computer system for synthesizing video comprising:

a plurality of independent layers, each layer providing image data associated with an object, the image data including a set of views of the object each view of the object augmented with data representing pixel correspondences between the views;

a composite image generator combining the image data associated with the objects dependent on relative pixel depth provided by the pixel correspondences to generate composite images of the objects; and a view generator generating from the composite images a geometrically correct output image of the objects as viewed from an arbitrary viewpoint.

12. The system of claim 11, wherein the view generator finds a pixel in the output image with an unspecified pixel value and determines which one of the sources of image data should provide a pixel value for the unspecified pixel value.

13. The system of claim 11, further comprising a user interface for modifying the image data associated with the one of the objects before combining the image data of the first and second objects.

14. The system of claim 11, wherein the layer is selected from the group consisting of a set of still images, a video sequence of frames, and viewpoints of a 3-D model.

* * * * *